United States Patent [19]
Henry et al.

[11] Patent Number: 5,341,444
[45] Date of Patent: Aug. 23, 1994

[54] POLARIZATION COMPENSATED INTEGRATED OPTICAL FILTERS AND MULTIPLEXERS

[75] Inventors: Charles H. Henry, Skillman, N.J.; Michele A. Milbrodt, Macungie, Pa.; Henry H. Yaffe, Fanwood, N.J.

[73] Assignee: AT&T Bell Laboratories, Murray Hill, N.J.

[21] Appl. No.: 35,143

[22] Filed: Mar. 19, 1993

[51] Int. Cl.⁵ .................. G02B 6/12; G02B 6/10; H04J 14/00
[52] U.S. Cl. ............................ 385/11; 385/14; 385/24; 385/28; 385/29; 385/46; 385/130; 385/131; 385/132; 359/115; 359/120; 359/122
[58] Field of Search ............... 385/11, 14, 24, 27, 385/28, 29, 31, 32, 42, 43, 44, 46, 130, 131, 132, 141, 142, 144, 115, 120, 121, 122, 127, 138

[56] References Cited

U.S. PATENT DOCUMENTS

| | | | |
|---|---|---|---|
| 4,781,424 | 11/1988 | Kawachi et al. | 385/11 X |
| 4,911,513 | 3/1990 | Valette | 385/11 X |
| 4,978,188 | 12/1990 | Kawachi et al. | 385/14 X |
| 4,998,793 | 3/1991 | Henry et al. | 385/11 X |
| 5,091,983 | 2/1992 | Lukosz | 385/14 X |
| 5,136,671 | 8/1992 | Dragone | 385/46 |

OTHER PUBLICATIONS

Y. Shani, et al. "Integrated optic adiabatic polarization splitter on silicon", Appl. Phys. Lett. 56 (2) pp. 120–121, (Jan. 1990).

Y. Shani, et al. "Four-port integrated optic polarization splitter", Applied Optics, vol. 29, No. 3 pp. 337–339 (Jan. 1990).

R. Adar, et al. "Polarization independent narrow band Bragg reflection gratings made with silica-on-silicon waveguides", Appl. Phys. Lett. 60 (15) pp. 1779–1781 (Apr. 1992).

H. Takahashi, et al. "Polarization-insensitive arrayed-waveguide grating wavelength multiplexer on silicon", Optics Letters, vol. 17, No. 7 pp. 499–501 (Apr. 1992).

M. Kawachi, et al. "Laser trimming adjustment of waveguide birefringence in silica integrated optic ring resonators", Proc. CLEO'89, TuJ17 (1989).

M. Kawachi et al. "Birefringence control in high-silica single-mode channel waveguides in silicon", Proc. OFC/IOOC'87, TuQ31, (1987).

C. H. Henry, et al. "Glass Waveguides on Silicon for Hybrid Optical Packaging", 7 J. Lightwave Technol., pp. 1530–1539 (Oct. 1989).

H. Yaffe, et al. "Polarization independent Silicon-on-Silicon waveguide devices", IEEE/Lasers and Electro-Optics Society, Postdeadline Papers, (Mar. 1993).

Primary Examiner—Brian Healy
Attorney, Agent, or Firm—Glen E. Books

[57] ABSTRACT

In accordance with the invention the birefringence induced by compressive strain in silica waveguides on silicon substrates is compensated with a high index patch—such as silicon nitride—placed adjacent the core. The patch is disposed sufficiently close to the core to optically couple with the transmitted optical mode. The patch is preferably wider than the core to intersect the exponential tail of the transmitted optical mode. Such a high index patch preferentially couples TE polarization modes. By choosing an appropriate length for the patch, both strain and bend birefringence can be compensated.

11 Claims, 3 Drawing Sheets

POLARIZATION COMPENSATED INTEGRATED OPTICAL FILTERS AND MULTIPLEXERS

FIELD OF THE INVENTION

This invention relates to polarization compensated integrated optical devices. The invention is particularly useful for providing filters and multiplexers with a polarization independent spectral response.

BACKGROUND OF THE INVENTION

As optical fiber communications channels increasingly replace metal cable and microwave transmission links, integrated optical devices for directly processing optical signals become increasingly important. A particularly useful approach to optical processing is through the use of integrated glass waveguide structures formed on silicon substrates. The basic structure of such devices is described in C. H. Henry et al., "Glass Waveguides on Silicon for Hybrid Optical Packaging", 7 *J. Lightwave Technol.*, pp. 1530–1539(1989). In essence a silicon substrate is provided with a base layer of $SiO_2$, and a thin core layer of doped silica glass is deposited on the oxide. The core layer can be configured to a desired waveguide structure—typically 5–7 micrometers wide—using standard photolithographic techniques, and a layer of doped silica glass is deposited on the core to act as a top cladding. Depending on the precise configuration of the waveguide, such devices can perform a wide variety of functions such as beam splitting, tapping, multiplexing, demultiplexing and filtering.

One shortcoming of such devices, however, is birefringence induced in the waveguide core by compressive strain. The effect of this birefringence is that different polarization modes of transmitted light are presented with different effective indices of refraction. Specifically, the transverse magnetic mode (TM) encounters a greater index than does the transverse electric (TE) mode.

The dispersive effect is further aggravated by curves in the waveguide. When traversing a curve, optical modes are shifted radially outward. A mode loosely bound to the waveguide core (TM) will experience a greater outward shift than a mode more tightly bound (TE) with the consequence that the loosely bound mode has a greater optical path length and phase.

A number of techniques have been suggested for overcoming the intrinsic birefringence of glass-on-silicon waveguides. One method employs a half-wave plate inserted in the middle of a waveguide grating multiplexer to rotate the polarization by 90°. See H. Takahashi et al., "Polarization-Insensitive Arrayed-Waveguide Multiplexer on Silicon", *Opt. Letts.*, 17 (7), p. 499(1992). This approach leads to excessive loss. Another approach is to deposit on the waveguide a thick layer (six micrometers) of amorphous silicon. But the silicon layer must then be actively trimmed with a high power laser. See M. Kawatchi, et al, "Laser Trimming Adjustment of Waveguide Birefringence In Silica Integrated Optic Ring Resonators", Proc. CLEO '89, Tu J. 17 (April 1989). Yet a third approach is to etch grooves alongside the waveguide to release strain. This approach requires deep grooves on the order of 60 micrometers deep. See M. Kawatchi et al, "Birefringence Control in High-Silica Single-Mode Channel Waveguides in Silicon", Proc. OFC/IOOC '87, Tu Q 31 (Jan. 1987). Thus none of the proposals are completely satisfactory. Accordingly, there is a need for an improved method of compensating for strain-induced birefringence in integrated optical devices.

SUMMARY OF THE INVENTION

In accordance with the invention the birefringence induced by compressive strain in silica waveguides on silicon substrates is compensated with a high index patch—such as silicon nitride—placed adjacent the core. The patch is disposed sufficiently close to the core to optically couple with the transmitted optical mode. The patch is preferably wider than the core to intersect the exponential tail of the transmitted optical mode. Such a high index patch preferentially couples TE polarization modes. By choosing an appropriate length for the patch, both strain and bend birefringence can be compensated.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
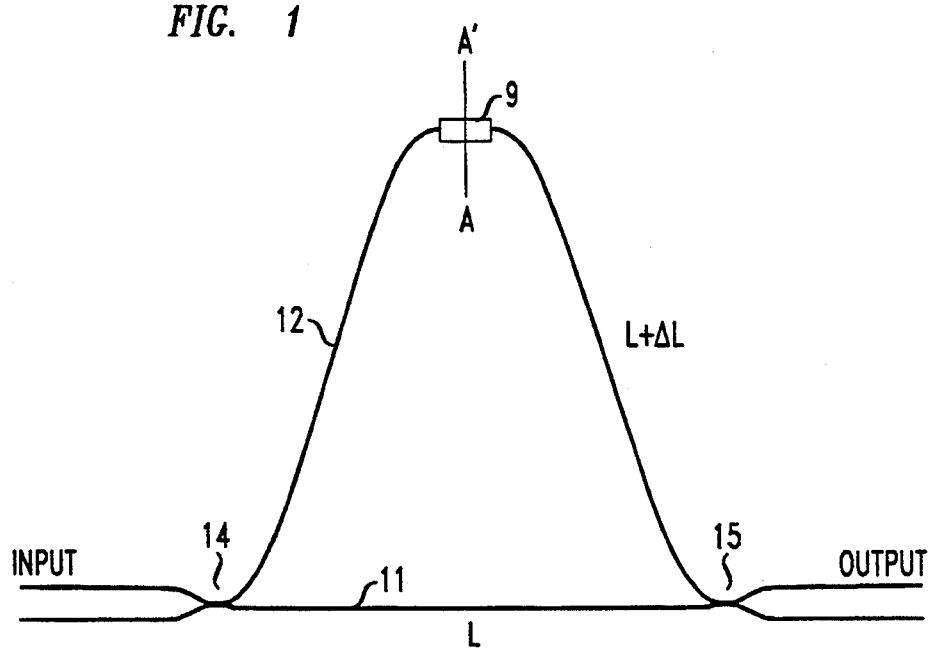
FIG. 1 is a schematic view of an integrated optical waveguide filter including a high index patch in accordance with the invention.

Referring to the drawings, FIG. 1 is a schematic top view of an integrated optical waveguide filter 10 including a high index patch 9 in accordance with the invention. The particular device shown comprises two waveguides 11 and 12 disposed on a silicon substrate 13 in a configuration useful as a Mach-Zehnder interferometer. Specifically, the two waveguides are closely adjacent at two regions 14 and 15 to form 3dB directional couplers which split and recombine light traveling on the two waveguides from input to output. The lower waveguide 11, referred to as the lower arm, has an optical path length L. The upper waveguide 12 has a longer path length $L+\Delta L$ and a configuration more curved than the lower arm 11. Patch 9 has a length 1 along the waveguide 12 and a width w transverse to the waveguide.

Figure 2:
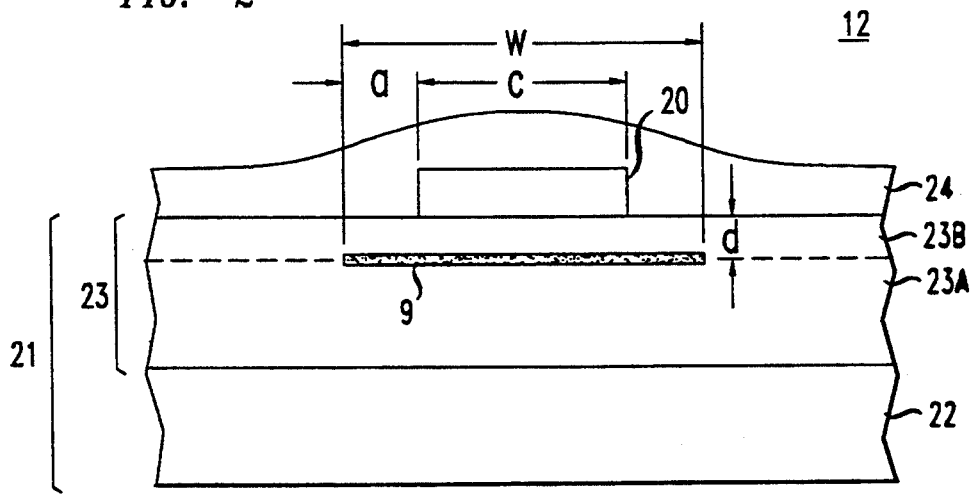
FIG. 2 is an enlarged schematic cross section of the device of FIG. 1 along the line AA'.

The nature and disposition of patch 9 is better shown in FIG. 2 which is a schematic cross section along AA' across waveguide 12 at patch 9. In essence the waveguide comprises a core 20 disposed upon a substrate 21 of silicon 22. The silicon substrate has an oxide outer layer 23. Oxide 23 acts as a lower cladding to core 20, and an upper cladding 24 is disposed over the core. Adjacent core 20 and spaced from the core by a small distance d is a thin high index patch 9. The patch is preferably underlying the core and surrounded by cladding 23.

As is well-known, light transmitted in core 20 extends in part outside the boundaries of the core with an intensity which decays exponentially with distance from the core boundary. For some characteristic distance x, the intensity will drop to 1/e the intensity at the boundary.

Patch 9 is spaced from the core by a distance d which sufficiently small that the patch couples with the optical mode in the core. Preferably $2d < x < d$. In the direction perpendicular to the major axis of the waveguide, the patch extends beyond either side of the waveguide by a sufficient distance to interact with the bulk of the light carried in the exponential tail from the core. Thus if c is the core width, the patch width w is preferably greater than $c+2x$. In addition patch 9 is thinner than core 20. As a practical matter, patch 9 preferably has an index of refraction of about 1.9 or more, a thickness in the range 100–500 angstroms, a width w of 10–25 micrometers and a length of 100 to 10,000 micrometers depending on the amount of compensation required.

The FIG. 2 structure can be fabricated much as described in the above-cited Henry et al. publication. A silicon substrate is provided with a first layer 23A of $SiO_2$ (typically about 15 $\mu$m) grown by high pressure steam oxidation. A silicon nitride layer (typically 200 Å) is deposited by low pressure chemical vapor deposition (LPCVD) and configured to form patch 9 using conventional photolithographic techniques. Additional oxide 23B of thickness d (typically 2 $\mu$m) is then deposited over the nitride by the chemical vapor deposition (CVD) process. A core layer of 8% phosphorus doped silica having a thickness in the range 4–6 micrometers is deposited on the oxide using LPCVD. The core layer is then appropriately masked and dry etched, as by RIE, to pattern the core layer into waveguides of desired configuration. The core glass is then annealed, and thereafter a top cladding such as a 7 $\mu$m layer of phosphorus and boron doped silica is deposited over the waveguide core. Typical waveguide core widths are in the range 5–7 micrometers.

The operation and optimal length 1 for patch 9 will be described in relation to the operation of the interferometer of FIGS. 1 and 2. In general, it is desired that light of a given wavelength $\lambda$ traveling over arms 11 and 12 should reach the output 3 dB coupler 15 with a phase difference $2\pi m$ where m, which has an integer or half-integer value, is the order of the interferometer. Including the effect of patch 9, the phase difference is $$\Delta \phi = \frac{2\pi}{\lambda} [n_1(L + \Delta L) - n_2 L + \Delta n1]$$

where $n_1$ and $n_2$ are the effective indices of refraction of the lower and upper arms, respectively, and $\Delta n1$ is the incremental path length due to patch 9.

For a given polarization, $n_1 = n_2$ in a straight waveguide. However, since the waveguides are birefringent due to strain in the $SiO_2$ layer, the TE and TM modes have different indices. Furthermore, the effective index of the TM mode will increase in arm 12 due to the curvature of the arm.

However, in the region of patch 9 the effective index of the TE mode will increase as compared with the TM mode. This is because TM polarized light induces charge on the surfaces of the high index patch. This induced charge in turn produces a field opposing the TM mode.

The changes in the transmission wavelength, $\lambda$, of a Mach-Zehnder interferometer due to birefringence, $\delta \lambda_{TE-TM}$, can be expressed by $$\frac{\delta \lambda_{TE-TM}}{\lambda} = \frac{\Delta n_{bi}}{n_{eff}} + \frac{\Delta n_{bend}}{n_{eff}} \cdot \frac{(L + \Delta L)}{\Delta L} + \frac{\Delta n1}{n_{eff} \Delta L}$$

where the components contributing to birefringence are explicitly specified. The strain birefringence is $\Delta n_{bi} = n_{eff}(TE) - n_{eff}(TM)$; the bend birefringence is $\Delta n_{bend} = n_{bend}(TE) - n_{bend}(TM)$; and the patch compensation is $\Delta n = n(TE) - n(TM)$. The patch term compensates the strain and bend terms because the sign of $\Delta n$ is opposite the signs of both $\Delta n_{bi}$ and $\Delta n_{bend}$.

Figure 3:
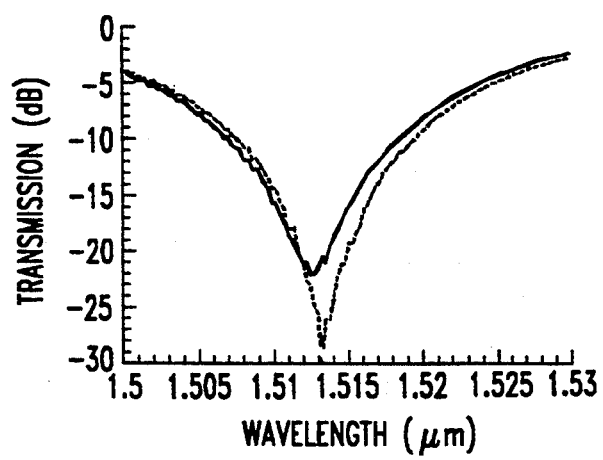
FIGS. 3, 4 and 5 are transmission scans for the device of FIG. 1 with patches of different lengths.
Figure 4:
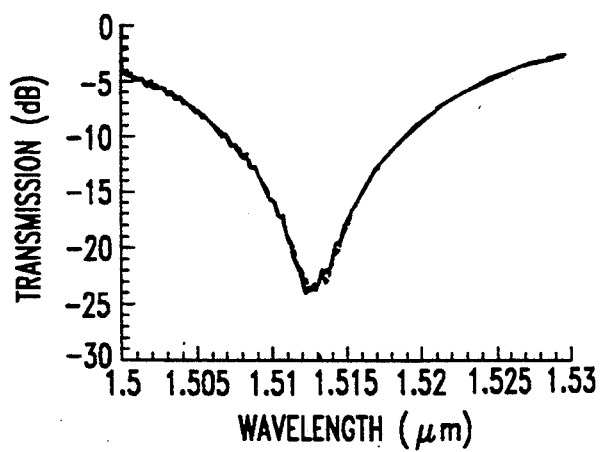
Figure 5:
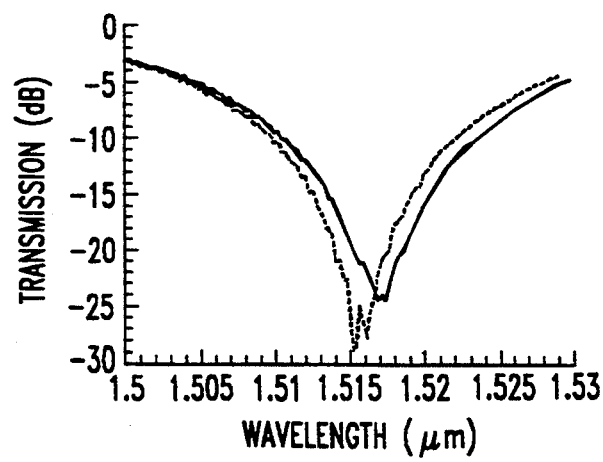

To determine typical patch length 1, a series of interferometers with different patch lengths were fabricated, on the same wafer having $Si_3N_4$ lengths at 100 $\mu$m increments. The interferometers had a 49 nm free spectral range, $L=10,298$ $\mu$m, $\Delta 1 = 30.69$ $\mu$m and order $M = 28$. FIGS. 3, 4 and 5 are transmission traces at the output for the 0 $\mu$m, 200 $\mu$m and 500 $\mu$m patches. The TE mode is shown as a solid curve and the TM mode as a dashed curve. In FIG. 3, with no patch, the TE mode is downshifted by 6.9 angstroms with respect to the TM mode. In FIG. 4, with a 200 $\mu$m long patch, the two polarizations have the same transmission splitting and all perceptible birefringence is compensated by the patch. In FIG. 5, with a 500 $\mu$m patch, the TE mode is upshifted by 15.1 angstroms. From a linear slope fit to the data, the coefficient for the birefringence compensation $$\frac{\Delta n}{n} = 8.64 \times 10^{-5}$$

for the structure described.

Figure 6:
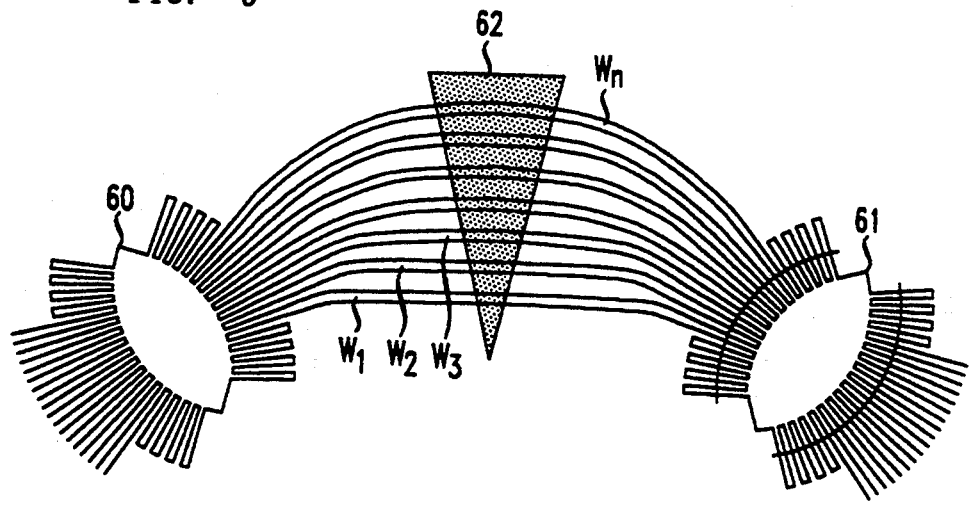
FIG. 6 is a schematic view of an integrated optical waveguide multiplexer/demultiplexer including a high index patch for providing a polarization independent spectral response.

FIG. 6 is a schematic view of an integrated optical waveguide multiplexer/demultiplexer including a high index patch for providing a polarization independent spectral response. The FIG. 6 multiplexer comprises an array of waveguides ($W_1, W_2, \ldots, W_n$) disposed between a pair of couplers 60 and 61. The structure and operation of this multiplexer is described in U.S. Pat. No. 5,136,671 issued to C. Dragone on Aug. 4, 1992, and entitled "Improved Optical Switch, Multiplexer and Demultiplexer." It is also described in 3 *IEEE Photonics Technical Letters* No. 9 (September 1991). These published descriptions are incorporated herein by reference. The device is particularly useful for making closely spaced, narrowband channels for dense wavelength division multiplexing.

It will be noted that waveguides $W_1, W_2, \ldots, W_n$ are increasingly bent as one moves outward from $W_1$, presenting the TM and TE modes with progressively different effective indices of refraction for the reasons described in connection with FIG. 1. The resulting birefringence is governed by the same relations developed above and can be elegantly corrected by a small wedge shaped patch 62 of high index material such as silicon nitride underlying and extending across the array of waveguides.

Figure 7:
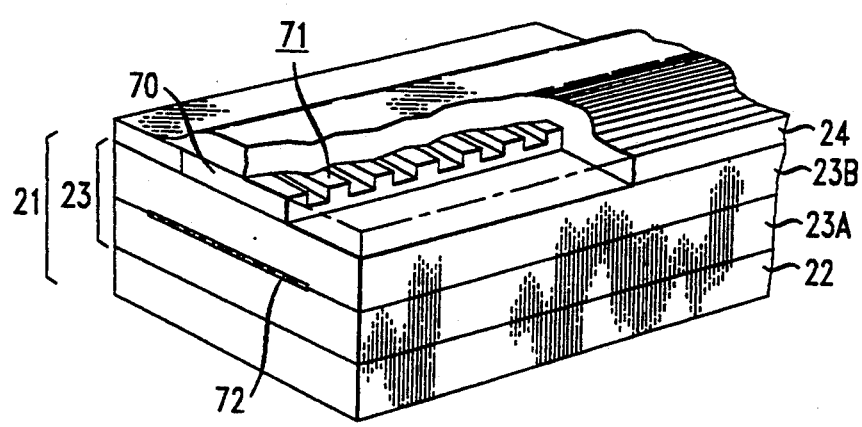
FIG. 7 shows as alternative optical waveguide filter including a high index patch.

FIG. 7 is a schematic view of an alternative optic waveguide filter including a high index patch. In essence, the filter shown comprises a single optical waveguide similar to that shown in FIG. 2 except that the core 70 is provided with periodic grooves forming a Bragg grating 71. The structure and operation of such a filter is described in R. Adar, et al. "Polarization independent narrow Bragg reflection grating made with silica-on-silicon waveguides", *Appl. Phys. Lett.*, 60(15), p. 1779, (1992), which is incorporated herein by reference.

In this device birefringence between the TM and TE modes is induced in the waveguide core by compressive strain. A high index patch 72 of substantially the same dimensions as described in connection with FIG. 2 can provide a polarization independent spectral response.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

We claim:

1. In an optical waveguide device of the type comprising a substrate, a cladding layer disposed on said substrate, an elongated waveguide core having a refractive index higher than the indices of surrounding cladding material for transmitting light, and a top cladding disposed upon said core, said waveguide device characterized by the capacity to transmit light in a plurality of optical modes having different states of polarization and exhibiting different effective indices of refraction for said different states of polarization, the improvement comprising a patch of material for providing polarization independent spectral response disposed within said cladding layer spaced from said core but sufficiently close to said core to couple with transmitted optical modes, said patch having an index of refraction higher than that of said core, a width exceeding that of the core, a thickness in the range 100–500 angstroms and a length less than that of the waveguide.

2. A device according to claim 1 wherein said substrate comprises silicon.

3. A device according to claim 1 wherein said substrate comprises silicon and said cladding layer comprises $SiO_2$.

4. A device according to claim 1 wherein said substrate comprises silicon, said cladding layer comprises silica and said waveguide core comprises doped silica glass.

5. A device according to claim 1 or 2 or 3 or 4, wherein said patch comprises silicon nitride.

6. An optical waveguide device according to claim 1, configured to form an interferometer.

7. A device according to claim 1 wherein said patch has an index of refraction of 1.9 or more.

8. A device according to claim 1 wherein said patch has a width in the range 10–25 micrometers.

9. A device according to claim 1 wherein said core comprises a Bragg reflector.

10. In an integrated optic waveguide multiplexer/demultiplexer of the type comprising a pair of couplers and an array of waveguides between said couplers, a plurality of said waveguides exhibiting a progression of degrees of bending, the improvement comprising a wedge shaped patch of high index material having a thickness in the range 100–500 angstroms underlying said plurality of waveguides for providing said waveguides with a polarization independent response.

11. The multiplexer of claim 10 wherein said high index patch comprises silicon nitride.

* * * * *